(12) United States Patent
Nakayama et al.

(10) Patent No.: US 12,301,075 B2
(45) Date of Patent: May 13, 2025

(54) METHOD FOR MANUFACTURING STATOR OF ROTATING ELECTRICAL MACHINE, STATOR OF ROTATING ELECTRICAL MACHINE, AND ROTATING ELECTRICAL MACHINE

(71) Applicant: HITACHI ASTEMO, LTD., Hitachinaka (JP)

(72) Inventors: Kenichi Nakayama, Ibaraki (JP); Akira Toba, Ibaraki (JP); Hiromitsu Okamoto, Ibaraki (JP); Teruaki Higuchi, Ibaraki (JP); Zhi Jing, Ibaraki (JP); Satoshi Yamamura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 343 days.

(21) Appl. No.: 17/777,991

(22) PCT Filed: Nov. 4, 2020

(86) PCT No.: PCT/JP2020/041141
§ 371 (c)(1),
(2) Date: May 18, 2022

(87) PCT Pub. No.: WO2021/100457
PCT Pub. Date: May 27, 2021

(65) Prior Publication Data
US 2022/0416630 A1    Dec. 29, 2022

(30) Foreign Application Priority Data
Nov. 20, 2019    (JP) ................. 2019-209364

(51) Int. Cl.
*H02K 15/00*    (2006.01)
*H02K 1/16*    (2006.01)
(Continued)

(52) U.S. Cl.
CPC ......... *H02K 15/0068* (2013.01); *H02K 1/165* (2013.01); *H02K 3/12* (2013.01);
(Continued)

(58) Field of Classification Search
CPC ........ H02K 3/12; H02K 3/04; H02K 15/0068; H02K 15/085; H02K 15/04
See application file for complete search history.

(56) References Cited

U.S. PATENT DOCUMENTS

2003/0020357 A1* 1/2003 Harada ................ H02K 15/024
310/216.004
2003/0222528 A1    12/2003 Dobashi et al.
(Continued)

FOREIGN PATENT DOCUMENTS

CN    108141083 A * 6/2018 ............... H02K 1/16
CN    109980823 A * 7/2019 ............. B23K 26/00
(Continued)

OTHER PUBLICATIONS

CN 108141083 A Machine Translation (Year: 2018).*
(Continued)

*Primary Examiner* — Tran N Nguyen
*Assistant Examiner* — Masoud Vaziri
(74) *Attorney, Agent, or Firm* — Foley & Lardner LLP (57) ABSTRACT

The reliability of a rotating electrical machine is improved. A method for manufacturing a stator used in a rotating electrical machine includes: a first step of arranging a first segment coil and a second segment coil to face each other; a second step of processing the first segment coil to generate a bridge part that comes into contact with the second segment coil; and a third step of joining the bridge part and the second segment coil by laser welding.

8 Claims, 7 Drawing Sheets

(51) Int. Cl.
*H02K 3/12* (2006.01)
*H02K 3/34* (2006.01)
*H02K 3/48* (2006.01)
*H02K 15/064* (2025.01)

(52) U.S. Cl.
CPC ............... *H02K 3/345* (2013.01); *H02K 3/48* (2013.01); *H02K 15/064* (2013.01)

(56) References Cited

U.S. PATENT DOCUMENTS

| | | | |
|---|---|---|---|
| 2009/0267441 A1* | 10/2009 | Hiramatsu | H02K 15/066 310/215 |
| 2017/0033636 A1* | 2/2017 | Ishizuka | H02K 15/0081 |
| 2017/0257002 A1* | 9/2017 | Ishizuka | H02K 15/0068 |
| 2018/0036836 A1 | 2/2018 | Nakamura | |
| 2018/0248453 A1* | 8/2018 | Nakayama | H02K 1/28 |
| 2019/0013704 A1 | 1/2019 | Pydin | |
| 2020/0303999 A1 | 9/2020 | Miyazaki et al. | |

FOREIGN PATENT DOCUMENTS

| | | | | |
|---|---|---|---|---|
| JP | S60-261337 A | 12/1985 | | |
| JP | S61-192644 U | 11/1986 | | |
| JP | H01-185149 A | 7/1989 | | |
| JP | 2003-284300 A | 10/2003 | | |
| JP | 2013-109948 A | 6/2013 | | |
| JP | 2018-020340 A | 2/2018 | | |
| JP | 2019-017223 A | 1/2019 | | |
| KR | 20010062251 A | * | 7/2001 | ............... H02K 1/16 |
| WO | WO-2016103989 A1 | * | 6/2016 | ............ H01R 4/021 |
| WO | WO-2019111569 A1 | * | 6/2019 | ......... H02K 15/0081 |

OTHER PUBLICATIONS

CN 109980823 A Machine Translation (Year: 2019).*
WO 2016103989 A1 Machine Translation (Year: 2016).*
KR 20010062251 A Machine Translation (Year: 2001).*
WO-2019111569-A1 Machine Translation (Year: 2019).*
Office Action issued in corresponding Japanese Patent Application No. 2021-558268, with English Machine Translation dated Jun. 27, 2023 (10 pages).
International Search Report (with English translation) and Written Opinion in PCT/JP2020/041141 dated Mar. 9, 2021.

* cited by examiner

METHOD FOR MANUFACTURING STATOR OF ROTATING ELECTRICAL MACHINE, STATOR OF ROTATING ELECTRICAL MACHINE, AND ROTATING ELECTRICAL MACHINE

TECHNICAL FIELD

The present invention relates to a stator of a rotating electrical machine and a method for manufacturing the same.

BACKGROUND ART

The rotating electrical machine generates a rotating magnetic field by supplying alternating current power to the stator coil, and can rotate the rotor by this rotating magnetic field. It is also possible to convert mechanical energy applied to the rotor into electric energy and output alternating current power from the coil. Thus, the rotating electrical machine operates as an electric motor or a generator. Since the rectangular wire of the stator in the rotating electrical machine has a high turn and the number of welding points increases, productivity is a problem in conventional TIG welding.

Therefore, there is a demand for manufacturing a stator using laser welding.

Background technology of the present technical field includes the following prior technology. PTL 1 (JP 2013-109948 A) describes a joining structure of an assembly in which ends of rectangular wires coated with insulating coatings and having rectangular cross sections are welded together, the joining structure for rectangular wires in which the rectangular wires are heated and welded by irradiating end faces of the rectangular wires with laser light in spots from above in a state where film-peeled surfaces obtained by peeling the insulating coatings from only one face of the ends are butted against each other so as to face each other.

CITATION LIST

Patent Literature

PTL 1: JP 2013-109948 A

SUMMARY OF INVENTION

Technical Problem

When laser welding is used for manufacturing a stator, there is a problem that an insulator (e.g., enamel) covering a surface of a winding is irradiated with laser light, the insulator is burned and copper is exposed, insulation of a coil is lowered, and reliability of a rotating electrical machine is lowered.

Solution to Problem

A representative example of the invention disclosed in the present application is as follows. That is, a method for manufacturing a stator used in a rotating electrical machine, includes: a first step of arranging a first segment coil and a second segment coil to face each other; a second step of processing the first segment coil to generate a bridge part that comes into contact with the second segment coil; and a third step of joining the bridge part and the second segment coil by laser welding.

Advantageous Effects of Invention

According to the present invention, welding is performed while leaving the enamel coating on a non-connection surface, insulation properties are secured, and reliability of the rotating electrical machine can be improved. Problems, configurations, and effects other than those described above will be made clear by the description of the following example.

DESCRIPTION OF EMBODIMENTS

An example of the present invention will be described below with reference to the drawings.

The rotating electrical machine according to the present embodiment is a rotating electrical machine suitable for use in traveling of vehicles. Here, a so-called electric vehicle using a rotating electrical machine includes a hybrid type electric vehicle (HEV) including both an engine and a rotating electrical machine and a pure electric vehicle (EV) that travels only with a rotating electrical machine without using an engine, and the rotating electrical machine described below can be used for both types of vehicles.

Figure 1:
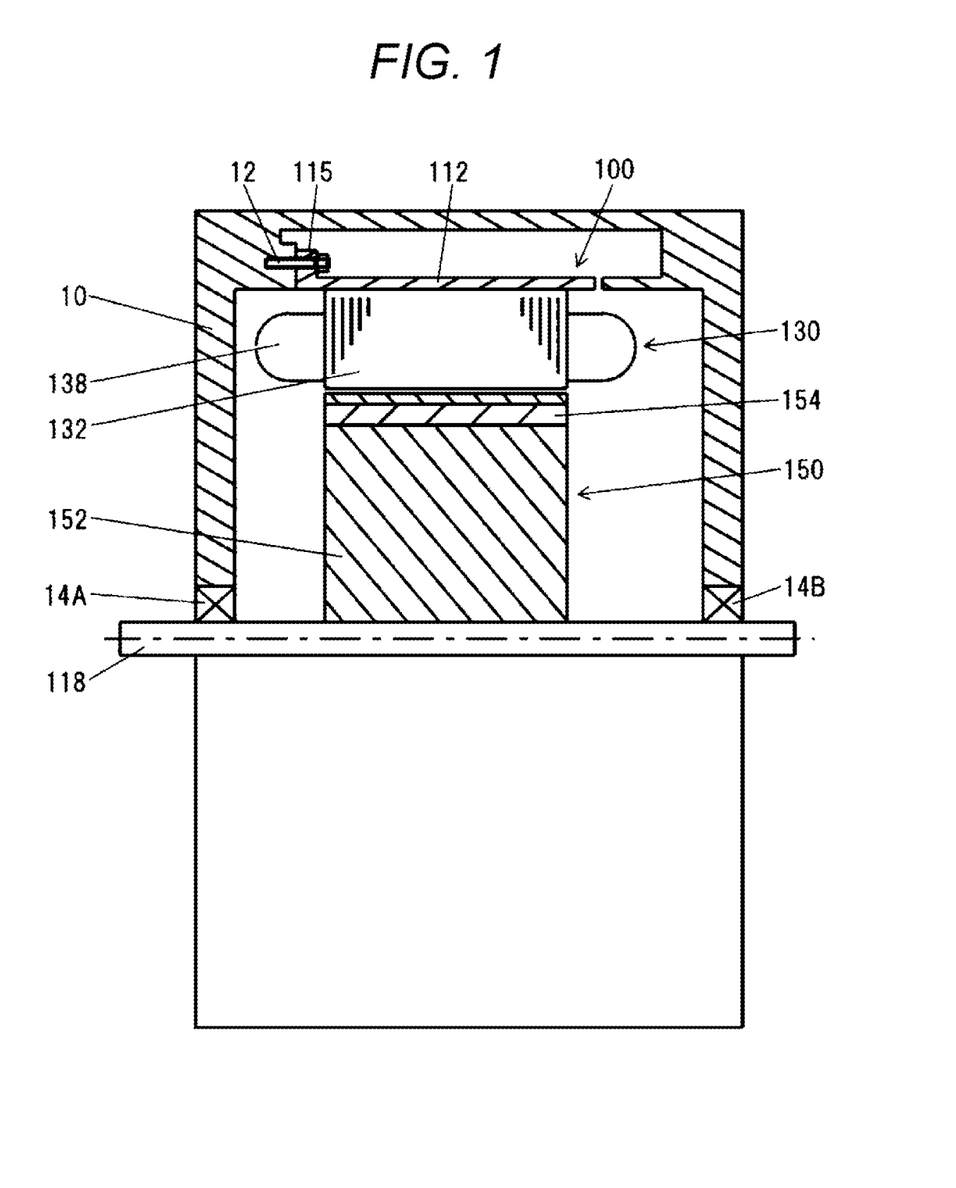
FIG. 1 is a schematic diagram illustrating an overall configuration of a rotating electrical machine according to an embodiment of the present invention.

FIG. 1 is a schematic diagram illustrating an overall configuration of a rotating electrical machine 100 according to an example of the present invention. FIG. 1 illustrates an inside of the rotating electrical machine 100 with a part of the rotating electrical machine 100 as a cross section. The rotating electrical machine 100 is disposed inside a case 10 and includes a housing 112, a stator 130 having a stator core 132 fixed to the housing 112, and a rotor 150 rotatably disposed in the stator 130. The case 10 may be configured integrally with the case of the engine or the case of the transmission.

This rotating electrical machine 100 is a three-phase synchronous motor with a built-in permanent magnet. In the present example, a three-phase synchronous motor will be described as an example of the rotating electrical machine 100, but the present invention can also be applied to an induction motor.

The rotating electrical machine 100 of the present example operates as an electric motor that rotates the rotor 150 with a three-phase alternating current being supplied to a stator coil 138 wound around the stator core 132. When driven by an engine, the rotating electrical machine 100 operates as a generator and outputs generated power of three-phase alternating current. That is, the rotating electrical machine 100 has both a function as an electric motor that generates rotational torque on the basis of electric energy and a function as a generator that generates power on the basis of mechanical energy, and can selectively use the above-described functions depending on the traveling state of the vehicle.

The stator 130 is fixed to the housing 112. The stator 130 is fixed and held in the case 10 by fastening a flange 115 provided in the housing 112 to the case 10 with a bolt 12. The rotor 150 fixed to a rotation shaft 118 is supported by bearings 14A and 14B of the case 10, and is rotatably held inside the stator core 132.

Figure 2:
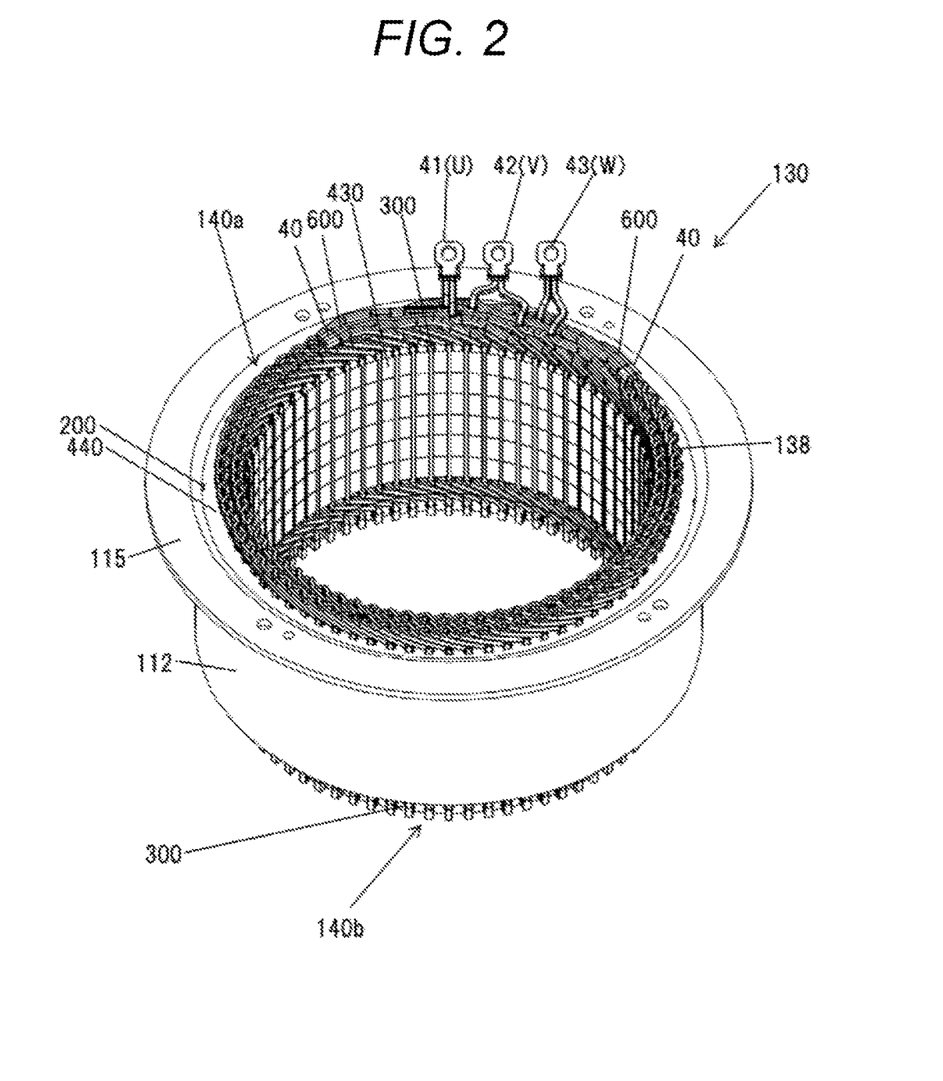
FIG. 2 is a perspective view illustrating a stator of the rotating electrical machine according to the embodiment of the present invention.
Figure 3:
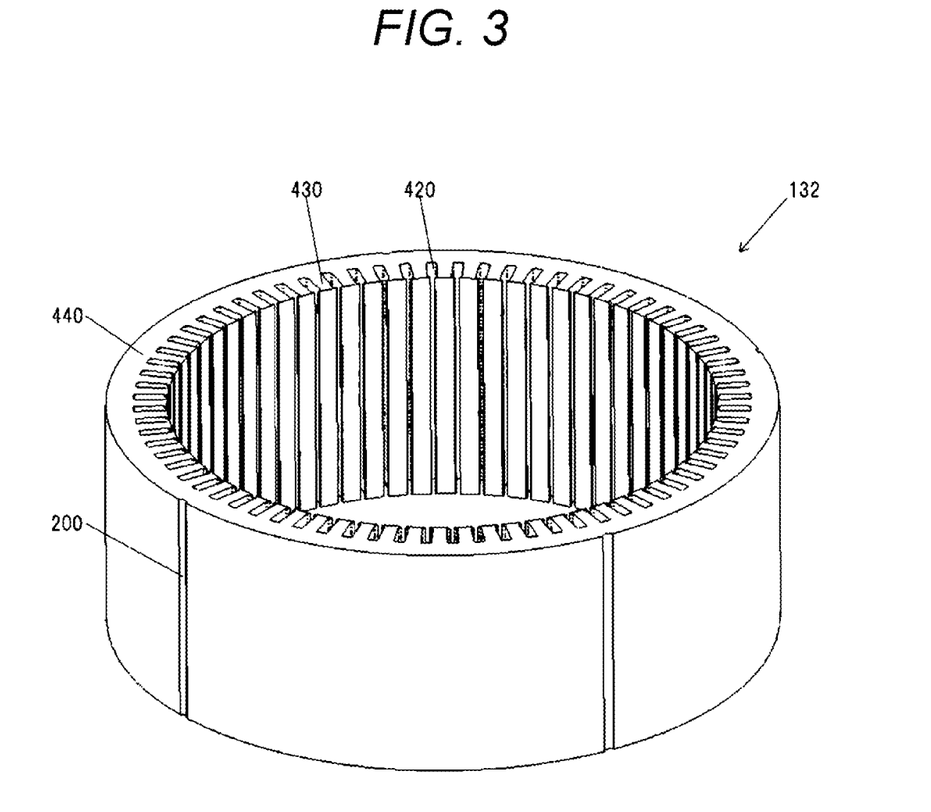
FIG. 3 is a perspective view of a stator core.

FIG. 2 is a perspective view illustrating the stator 130 attached to the housing 112, and FIG. 3 is a perspective view of the stator core 132. The housing 112 is formed in a cylindrical shape by drawing process on a steel plate (such as a high-tensile steel plate) having a thickness of about 2 to 5 mm. The flange 115 is provided at one axial end of the housing 112, and is fixed to the case 10 with a bolt as described above (see FIG. 1). The flange 115 is formed integrally with the housing 112 by drawing process. Note that the stator 130 may be directly fixed to the case 10 without providing the housing 112.

The stator 130 is fixed to an inner peripheral side of the housing 112 and has the stator core 132 having a cylindrical shape and the stator coil 138 mounted to the stator core 132. The stator core 132 is formed by stacking a plurality of electromagnetic steel sheets 133 molded by punching process or etching process with a thickness of about 0.05 to 1.0 mm, for example. The stacked electromagnetic steel sheets 133 are connected and fixed by welding, and deformation of the electromagnetic steel sheets 133 due to fastening force when press-fitted into the housing 112 is suppressed.

In the stator core 132, a plurality of slots 420 extending in the axial direction are formed at equal intervals in the circumferential direction. The number of slots 420 is, for example, 72 in the present embodiment. The slot 420 accommodates the stator coil 138 as illustrated in FIG. 2. In the example illustrated in FIG. 3, the slot 420 is an open slot, and an opening is formed on the inner peripheral side of the stator core 132. The circumferential width of this opening is preferably substantially equal to or slightly smaller than a coil mounting part of each slot 420 to which the stator coil 138 is mounted.

An insulating paper (so-called slot liner) 300 is disposed in each slot 420. The insulation paper 300 is, for example, an insulating sheet of heat-resistant polyamide paper, and has a thickness of about 0.1 to 0.5 mm. The insulation paper 300 is disposed in the slot 420 and coil ends 140a and 140b. By being disposed in the slot 420, the insulation paper 300 is disposed between the coils inserted into the slot 420 and between the coil and an inner surface of the slot 420, thereby improving insulation withstand voltage between the coils and between the coil and the inner surface of the slot 420.

The stator coil 138 is formed by connecting a plurality of U-shaped segment coils 28 (See FIGS. 4 and 5D) to each other. The segment coil 28 is arranged such that one end part thereof is adjacent to another segment coil 28 such that the end part thereof is exposed from the slot 420 (i.e., the stator 130), with the other end part thereof being adjacent to yet another segment coil 28. The segment coils 28 whose end parts are adjacent to each other form the stator coil 138 wound around the stator core 132 by connecting the adjacent end parts to each other.

The insulation paper 300 disposed at the coil ends 140a and 140b is annularly disposed between the coils for inter-phase insulation and interconductor insulation at the coil ends 140a and 140b. Thus, in the rotating electrical machine 100 of the present example, since the insulation paper 300 is disposed inside the slot 420 and at the coil ends 140a and 140b, even if enamel coating 281 for insulation of the coils is damaged or deteriorated, a necessary insulation withstand voltage can be held.

Teeth 430 are formed between the slots 420, and each of the teeth 430 is integrally molded with an annular core back 440. The stator core 132 is an integrated core in which the teeth 430 and the core back 440 are integrally molded. The teeth 430 guide the rotating magnetic field generated by the stator coil 138 to the rotor 150, and cause the rotor 150 to generate rotational torque.

The rotor 150 has a rotor core 152 and a permanent magnet 154 held in a magnet insertion hole formed in the rotor core 152.

In the rotor core 152, rectangular parallelepiped magnet insertion holes are formed at equal intervals in the circumferential direction in the vicinity of the outer peripheral part. The permanent magnet 154 is embedded in each magnet insertion hole and fixed with an adhesive or the like. A circumferential width of the magnet insertion hole is formed to be larger than a circumferential width of the permanent magnet 154, and magnetic gaps 156 are formed on both sides of the permanent magnet 154. This magnetic gap 156 may be filled with an adhesive or may be fixed integrally with the permanent magnet 154 with a resin.

The permanent magnet 154 forms a field pole of the rotor 150. Note that in the present embodiment, one permanent magnet 154 is configured to form one magnetic pole, but one magnetic pole may be configured to be formed by a plurality of permanent magnets. By increasing the number of permanent magnets for forming each magnetic pole to a plurality of them, a magnetic flux density of each magnetic pole generated by the permanent magnet increases, and magnet torque can be increased. As the permanent magnet 154, a neodymium-based or samarium-based sintered magnet, a ferrite magnet, a neodymium-based bonded magnet, or the like can be used, but the residual magnetic flux density of the permanent magnet 154 is desirably about 0.4 to 1.3 T, and a neodymium-based magnet is more suitable. An auxiliary magnetic pole may be formed between the permanent magnets 154.

When a three-phase alternating current is supplied to the stator coil 138 to generate a rotating magnetic field in the stator 130, this rotating magnetic field acts on the permanent magnet 154 of the rotor 150 to generate magnet torque. Since the reluctance torque described above is generated in the rotor 150 in addition to this magnet torque, both the magnet torque and the reluctance torque described above act as rotational torque in the rotor 150, and a large rotational torque can be obtained.

Figure 4:
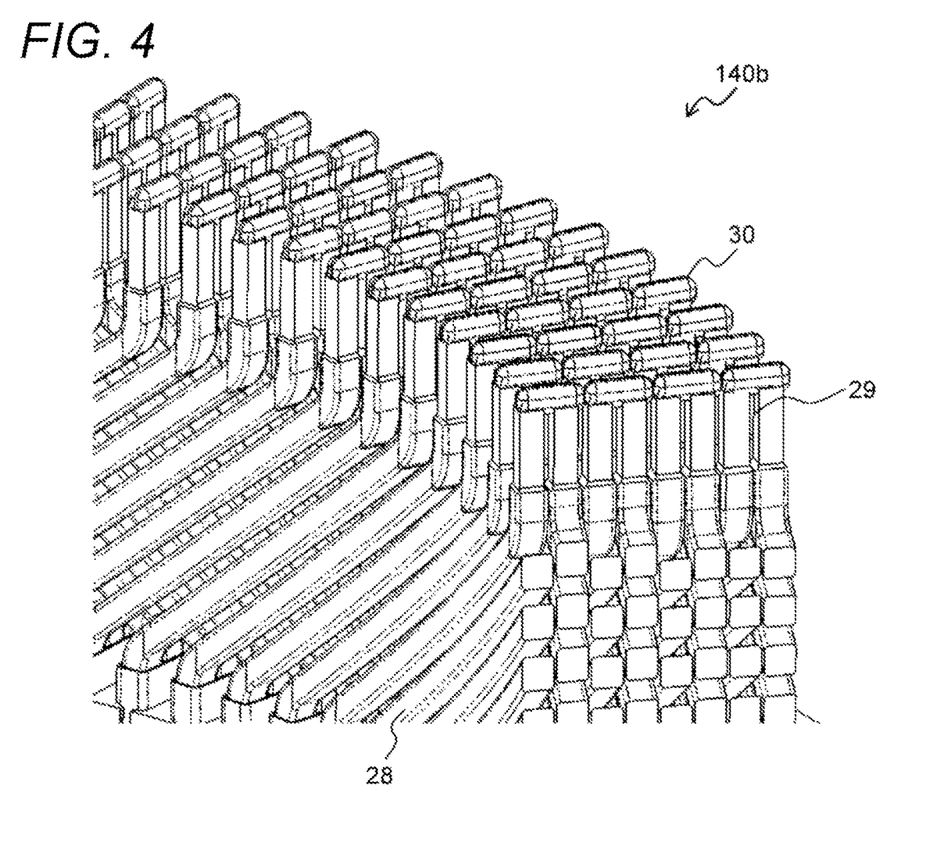
FIG. 4 is a perspective view of a coil end after welding.

FIG. 4 is a perspective view of the coil end 140b after welding.

In the present example, eight segment coils 28 are arranged in each slot 420, and as illustrated in FIG. 4, end parts of two adjacent segment coils 28 are welded and connected to configure the coil end 140*b*. For example, by laser welding, arc welding such as tungsten inert gas (TIG) welding, plasma welding, or the like, the base material of the copper wire constituting the segment coil 28 is melted to form a welded part 30, and the end parts of the segment coils 28 are connected.

FIGS. 5A to 5D are views illustrating the process on the segment coil 28.

Figure 5A:
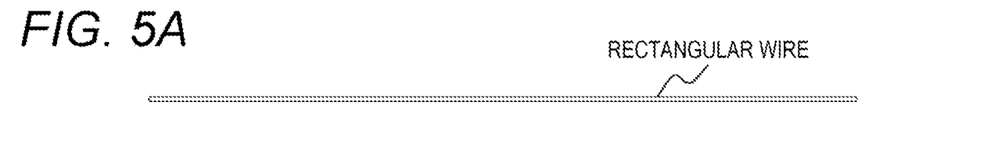
FIG. 5A is a view illustrating a rectangular wire before being processed into a segment coil.

The segment coil 28 is processed from a long rectangular wire as illustrated in FIG. 5A.

Figure 5B:
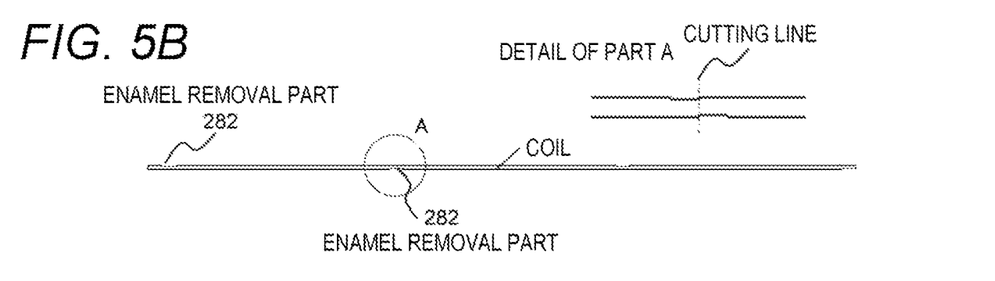
FIG. 5B is a view illustrating a rectangular wire after enamel coating is removed.
Figure 5C:
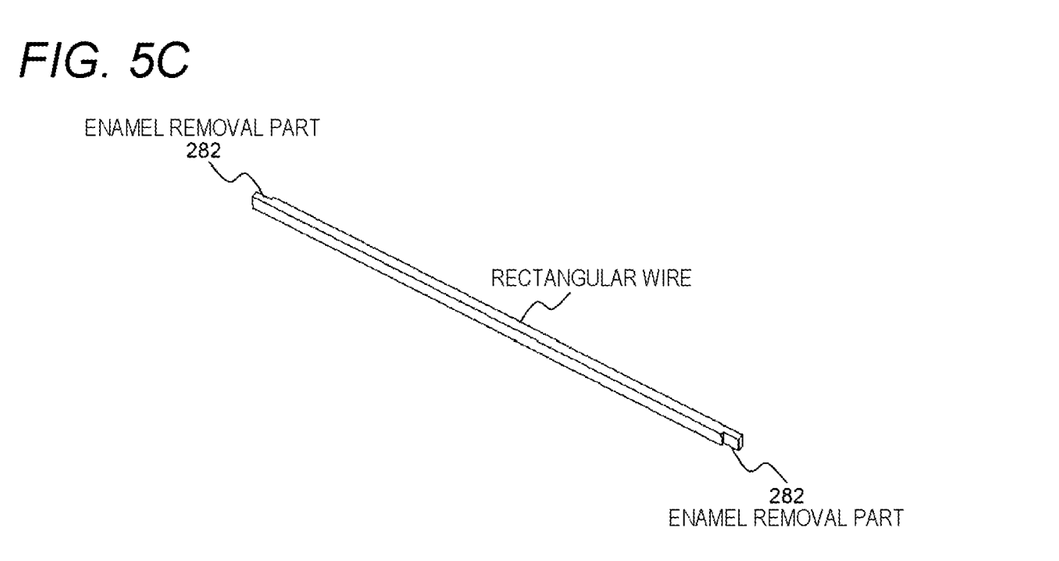
FIG. 5C is a view illustrating a rectangular wire after cutting.

Then, the rectangular wire is thinly cut on the surface so as to remove the enamel coating 281 on the surface at a position that becomes the end part of the segment coil 28 (see FIG. 5B). The enamel coating 281 may be removed by laser light or cutting on the surface. Since an enamel removal part 282 is provided on another surface of the rectangular wire (see FIG. 5D) when processed into the segment coil 28, the enamel coating 281 is removed on the other surface of the rectangular wire (see FIG. 5C).

Thereafter, the rectangular wire is cut to a predetermined length at the position of the enamel removal part 282. The segment coil 28 after being cut to a desired length has the enamel removal parts 282 at both ends, and the enamel removal part 282 is provided on the opposite surface (see FIG. 5C).

Figure 5D:
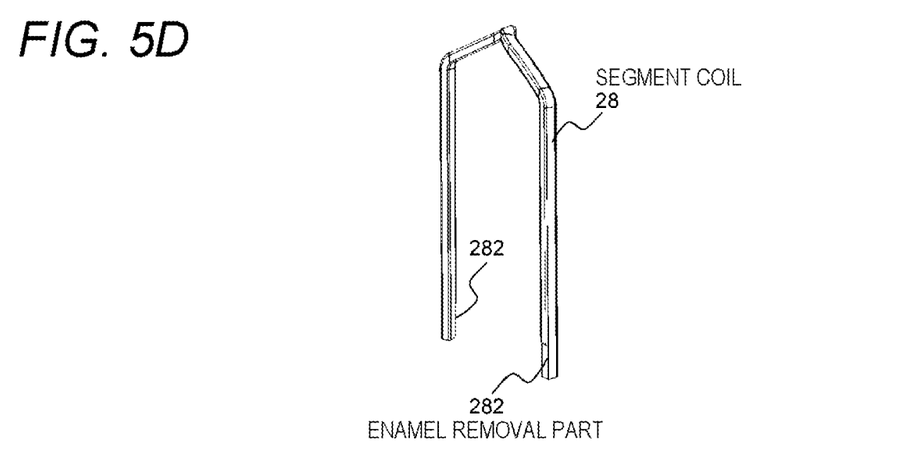
FIG. 5D is a view illustrating a segment coil after shaping.

Thereafter, as illustrated in FIG. 5D, the rectangular wire is shaped into the U-shaped segment coil 28 and inserted into the slot 420 of the stator core 132.

FIGS. 6A to 6E are views illustrating the welding process of the end part of the segment coil 28.

Figure 6A:
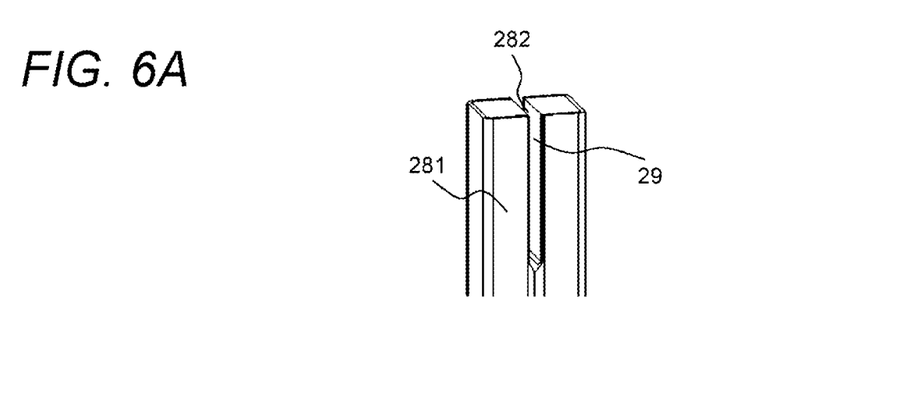
FIG. 6A is a perspective view of a segment coil arranged in a slot.

As illustrated in FIG. 6A, in the segment coil 28 inserted into the slots 420 of the stator core 132, the enamel removal parts 282 are arranged so as to face each other (first step). In this state, the enamel removal part 282 is formed on the facing surface of the segment coil 28 facing each other, and the enamel coating 281 remains on the surfaces other than the facing surface. Between the facing segment coils 28, a gap 29 is present by the amount of removal of the enamel coating (or copper base material together with the enamel coating 281).

Thereafter, an end face of the segment coil 28 is cut in a predetermined direction (from the right side to the left side in FIG. 6B), and a bridge part 283 is formed in the gap 29 between the segment coils 28 (second step). The bridge part 283 is formed so as to extend to a position where the tip thereof comes into contact with the facing segment coil 28. An R part having a radius of about 0.5 mm is preferably formed on the opposite side of the bridge part 283 of the segment coil 28 in which the bridge part 283 is formed.

Figure 6B:
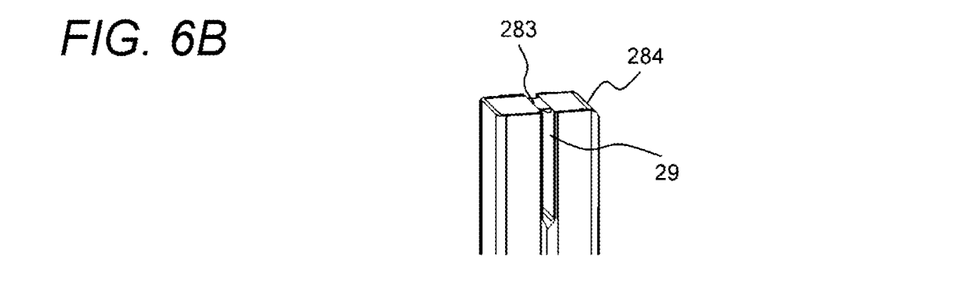
FIG. 6B is a perspective view of the segment coil after a bridge part is formed.
Figure 6C:
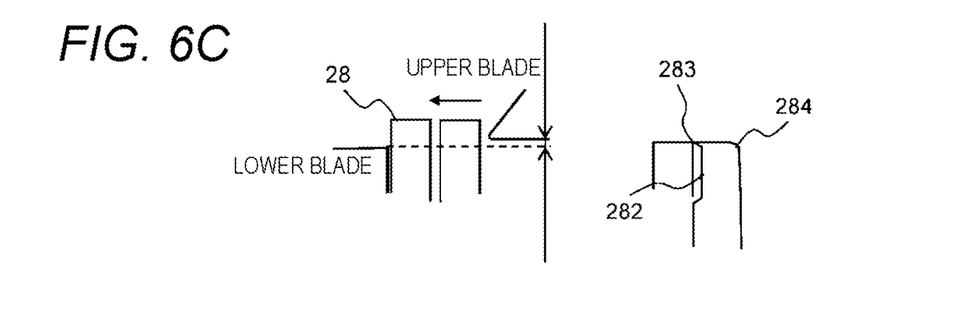
FIG. 6C is a view illustrating formation of the bridge part.

In the processing of the bridge part 283, for example, as illustrated in FIG. 6C, after the tip end of the segment coil 28 is sandwiched between a lower blade and an upper blade, the upper blade is moved in the arrow direction to cut the end part of the segment coil 28. At this time, the bridge part 283 and an R part 284 are formed at the end part of the segment coil 28 on the upper blade side. A clearance between the upper blade and the lower blade is preferably 0.04 to 0.08 mm. It is preferable to provide a small amount (e.g., about 0.5 mm) of chamfering or a curved surface at the tip end of the upper blade so that the bridge part 283 having an appropriate size can be formed. The bridge part 283 and the R part 284 may be formed using a mold (e.g., a push mold). In this case, the bridge part 283 and the R part 284 are preferably formed before the segment coil 28 is inserted into the slot 420. For example, the bridge part 283 and the R part 284 may be formed when the rectangular wire is cut or processed into a U shape.

As illustrated in FIG. 6B, the bridge part 283 may be formed in one segment coil 28 or may be formed in both segment coils 28. In this case, the segment coil 28 is disposed such that the bridge parts 283 face each other.

Figure 6D:
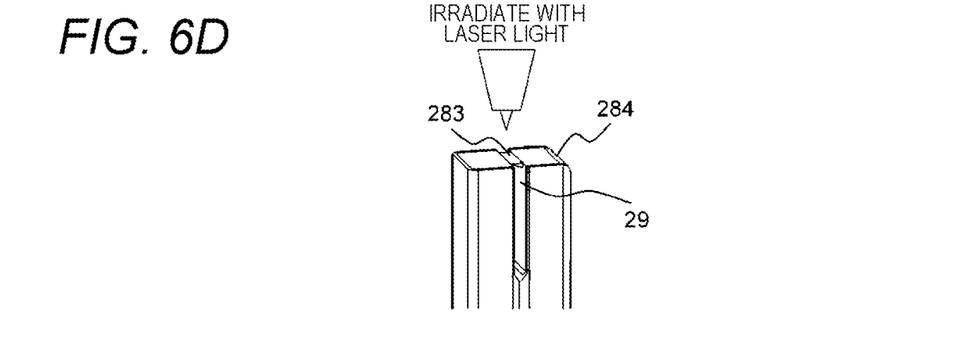
FIG. 6D is a view illustrating welding of a segment coil.

After the bridge part 283 is formed, as illustrated in FIG. 6D, the bridge part 283 is irradiated with laser light to melt copper and form the welded part 30 (third step). Since the gap 29 between the segment coils 28 cannot be seen from above by the bridge part 283, and the bridge part 283 shields the laser light irradiated from above, the laser light does not enter the gap 29 between the segment coils 28, the laser light does not hit the enamel coating 281, and the damage of the enamel coating 281 at the time of welding can be reduced.

Figure 6E:
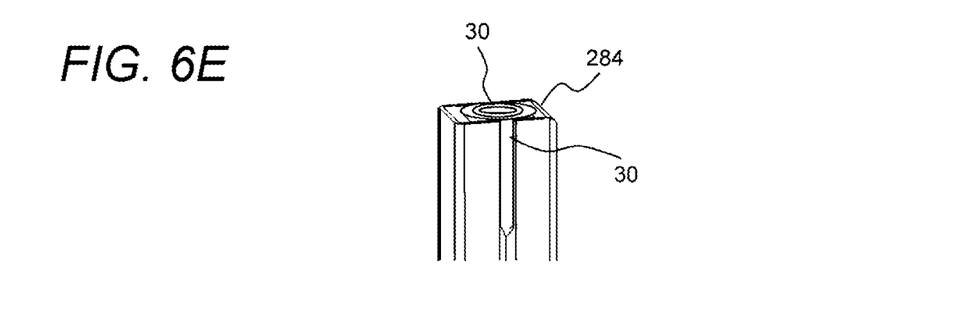
FIG. 6E is a perspective view of a segment coil after welding.

Then, as illustrated in FIG. 6E, molten copper enters the gap 29 to form the welded part 30. Molten copper flows into the gap 29 between the segment coils 28 to electrically and mechanically connect the segment coils 28 to each other.

Figure 7:
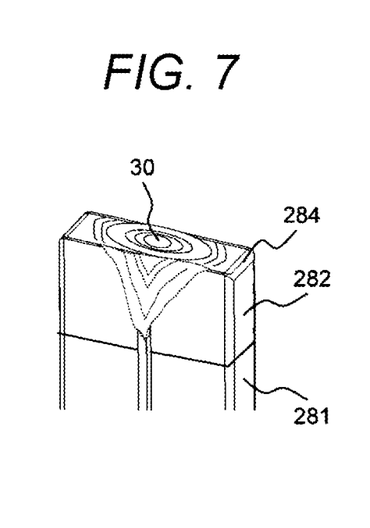
FIG. 7 is a perspective view of a coil end after TIG welding.

In the above description, the segment coils 28 are connected by laser welding, but as illustrated in FIG. 7, the segment coils 28 may be connected by TIG welding.

As described above, the example of the present invention includes the first step of arranging the first segment coil 28 and the second segment coil 28 face each other, the second step of processing the first segment coil 28 to generate the bridge part 283 that comes into contact with the second segment coil 28, and the third step of joining the bridge part 283 and the second segment coil 28 by laser welding. Therefore, in the segment coil 28, the enamel coating 281 is removed on a surface facing another segment coil 28 in the welded part 30, and the enamel coating 281 on another surface remains, and thus the segment coil 28 can be connected while leaving the enamel coating 281 on other than the connection surface, thereby improving the insulation. Since powder coating is more likely to adhere to the enamel coating 281 than to copper, insulating properties are improved by the enamel coating 281 and powder coating. Since the welded part 30 is not raised by laser welding, the height of the coil end can be reduced.

In the third step, since the segment coils 28 are joined to each other by irradiating the bridge part 283 with laser light, damage of the enamel coating 281 can be reduced, and only copper necessary for joining can be melted.

The segment coil 28 has a coated part covered with insulating coating and an exposed part not covered with the insulating coating, and the segment coils 28 are arranged to face each other across the gap 29 at the location where the exposed part faces. Therefore, since the portion other than a joint surface is covered with the enamel coating 281, the distance between the segment coil 28 and the housing 112 can be reduced.

Note that the above description is merely an example, and when interpreting the invention, there is no limitation or restriction on the correspondence between the matters described in the above embodiment and the matters described in the claims. For example, in the above-described embodiment, a rotating electrical machine including a permanent magnet in a rotor has been described as an example, but the present invention can be similarly applied to a stator of a rotating electrical machine such as an induction motor. The present invention can also be applied to other than a rotating electrical machine for driving a vehicle. It is possible to replace a part of the configuration of one embodiment with the configuration of another embodiment, or is also possible to add the configuration of another embodiment to the configuration of one embodiment.

Note that the present invention is not limited to the above-described example, but includes various modifications and equivalent configurations within the scope of the appended claims. For example, the above-described example has been described in detail for the purpose of explaining the present invention in an easy-to-understand manner, and the present invention is not necessarily limited to those including all the configurations described above. The configuration of a certain example may be replaced partly by the configuration of another example. The configuration of another embodiment may be added to the configuration of a certain example. A part of the configuration of each example may be added to, deleted from, or replaced with another configuration.

REFERENCE SIGNS LIST 28 segment coil
29 gap
29 welded part
100 rotating electrical machine
130 stator
132 stator core
140a, 140b coil end
150 rotor
281 enamel coating
282 enamel removal part
283 bridge part
284 R part
300 insulating paper
420 slot

The invention claimed is:

1. A method for manufacturing a stator used in a rotating electrical machine, comprising:
   a first step of forming a first segment coil and a second segment coil each having an exposed part on which insulating coating is removed on a facing surface;
   a second step of arranging the first segment coil and the second segment coil to face each other with a gap corresponding to an amount of removed insulating coating with the exposed parts facing in parallel;
   a third step of processing the first segment coil to generate a bridge part that comes into contact with the second segment coil; and
   a fourth step of joining the bridge part and the second segment coil by laser welding while maintaining the exposed parts in parallel.

2. A method for manufacturing a stator used in a rotating electrical machine, comprising:
   a first step of forming a first segment coil and a second segment coil each having an exposed part on which insulating coating is removed on a facing surface;
   a second step of processing a first segment coil to generate a bridge part that comes into contact with a second segment coil;
   a third step of arranging the first segment coil and the second segment coil to face each other with a gap corresponding to an amount of removed insulating coating with the exposed parts facing in parallel; and
   a fourth step of joining the bridge part and the second segment coil by laser welding while maintaining the exposed parts in parallel.

3. The method for manufacturing a stator according to claim 1, wherein
   in the fourth step, the bridge part is irradiated with laser light to join the first segment coil and the second segment coil.

4. A stator of a rotating electrical machine, comprising:
   a core part in which a slot is formed; and
   a segment coil that is disposed in the slot and covered with insulating coating,
   wherein the segment coil includes an exposed part arranged with a gap corresponding to an amount of removed insulating coating with the exposed parts facing in parallel, on which the insulating coating is removed on a facing surface and a bridge part that protrudes from one or both end parts of a pair of the segment coils and comes into contact with another segment coil, and
   the pair of segment coils are joined by welding of the bridge part while maintaining the exposed parts in parallel, and a welded part is formed at a position of the bridge part.

5. The stator according to claim 4, wherein
   a corner part on an opposite side of the welded part is formed in a curved surface at an end part of a segment coil having the bridge part.

6. The stator according to claim 4, wherein
   the pair of segment coils is joined by irradiation of the bridge part with laser light.

7. A rotating electrical machine comprising the stator according to claim 4.

8. The method for manufacturing a stator according to claim 2, wherein
   in the third step, the bridge part is irradiated with laser light to join the first segment coil and the second segment coil.

* * * * *